United States Patent [19]

Inokuchi et al.

[11] Patent Number: 4,494,179
[45] Date of Patent: Jan. 15, 1985

[54] CONTROL DEVICE FOR A CONVERTER

[75] Inventors: Haruhisa Inokuchi; Takami Sakai, both of Tokyo, Japan

[73] Assignee: Tokyo Shibaura Denki Kabushiki Kaisha, Kawasaki, Japan

[21] Appl. No.: 464,695

[22] Filed: Feb. 7, 1983

[30] Foreign Application Priority Data

Feb. 26, 1982 [JP] Japan ................................ 57-29902

[51] Int. Cl.³ .............................................. H02J 3/36
[52] U.S. Cl. ......................................... 363/35; 363/51
[58] Field of Search .................................. 363/34–35, 363/37, 51, 78–79, 85–87, 96

[56] References Cited

U.S. PATENT DOCUMENTS

| 3,707,669 | 12/1972 | Kanngiesser et al. | 363/51 |
| 3,829,756 | 8/1974 | Hockstetter | 363/35 |
| 4,264,951 | 4/1981 | Konishi et al. | 363/35 |
| 4,279,009 | 7/1981 | Andronov et al. | 363/51 X |
| 4,320,444 | 3/1982 | Häusler et al. | 363/51 X |

FOREIGN PATENT DOCUMENTS

| 3016970 | 6/1980 | Fed. Rep. of Germany . | |
| 11426 | 1/1979 | Japan | 363/51 |
| 584982 | 2/1977 | Switzerland . | |

Primary Examiner—Peter S. Wong
Attorney, Agent, or Firm—Oblon, Fisher, Spivak, McClelland & Maier

[57] ABSTRACT

A control device for a converter used in a DC transmission system comprises an automatic current regulator, an automatic margin-angle regulator and an automatic voltage regulator. The output of the automatic voltage regulator is supplied to the automatic margin-angle regulator to vary a margin-angle reference of the automatic margin-angle regulator.

4 Claims, 2 Drawing Figures

CONTROL DEVICE FOR A CONVERTER

BACKGROUND OF THE INVENTION

The present invention relates to a control device for a converter used in a DC transmission system.

Generally a DC transmission system comprises main transformers, two converters, control devices for the converters and DC transmission lines. Either converter is comprised of thyristor valves. One of them is a rectifier for converting AC power to DC power, and the other is an inverter for converting DC power to AC power. The control devices are used to control the phase angle of gate pulses to be supplied to the thyristor valves of either converter to thereby adjust the DC transmission power. Usually, constant current control is performed on the rectifier and constant margin-angle control is performed on the inverter. Nevertheless, an automatic current regulator and an automatic margin-angle regulator are provided for either converter. This is because the direction of the tidal current in the DC transmission system may be inverted. Output signals from both regulators flowing through a low value gate are converted to firing pulses. The firing pulses are supplied to the gates of the thyristor valves. The margin-angle setting value of the automatic margin-angle regulator is usually about 19° in order to avoid a commutation failure in the inverter operation mode. The current reference of the automatic current regulator for the inverter is made smaller than that of the rectifier by the amount of a current margin. Hence, in the control device on the rectifier side the output from the automatic current regulator precedes the output from the automatic margin-angle regulator and the opposite is true of the control device on the inverter side.

In the DC transmission system described above, DC voltage Ed is given as:

$$Ed = 1.35E\left(\cos\gamma - \frac{x \cdot i}{2 \cdot e}\right). \tag{1}$$

where, E is secondary winding voltage of the main transformers, $\gamma$ is margin-angle, x is commutation reactance (P.U.), i is DC current (P.U.), and e is commutation voltage (P.U.).

Commutation reactance x is about 20% based on the main transformer capability. This value is determined by the thyristor overcurrent capability in order to cope with a failure of the converters. As clearly understood from equation (1), if margin-angle is fixed, DC voltage Ed will change approximately 10% when DC current i changes from 0 to 1 P.U.

In order to prevent DC voltage Ed from changing, an automatic voltage regulator may be employed, in addition to the automatic current regulator and the automatic margin-angle regulator. The third regulator performs constant voltage control on the inverter. If the three regulators are negative feedback control circuits, an undesirable phenomenon may take place. When the automatic voltage regulator is operating in the inverter operation mode, the automatic margin-angle regulator is saturated. Its margin-angle $\gamma$ will temporarily become smaller than 19° when the AC voltage fluctuates. This is because the automatic margin-angle regulator cannot operate rapidly because it is saturated. This causes the reduction of margin-angle $\gamma$ which results in a commutation failure.

SUMMARY OF THE INVENTION

It is an object of the present invention to provide a control device which keeps DC voltage constant and which avoids a commutation failure due to reduction of margin-angle accompanying a fluctuation of AC voltage.

According to the invention, the control device comprises an automatic voltage regulator, an automatic margin-angle regulator controlled by an output signal from the automatic voltage regulator, an automatic current regulator, and a phase control circuit for supplying an output signal from either the automatic margin-angle regulator or the automatic current regulator to the gates of the converters.

DETAILED DESCRIPTION OF THE PREFERRED EMBODIMENTS

Figure 1:
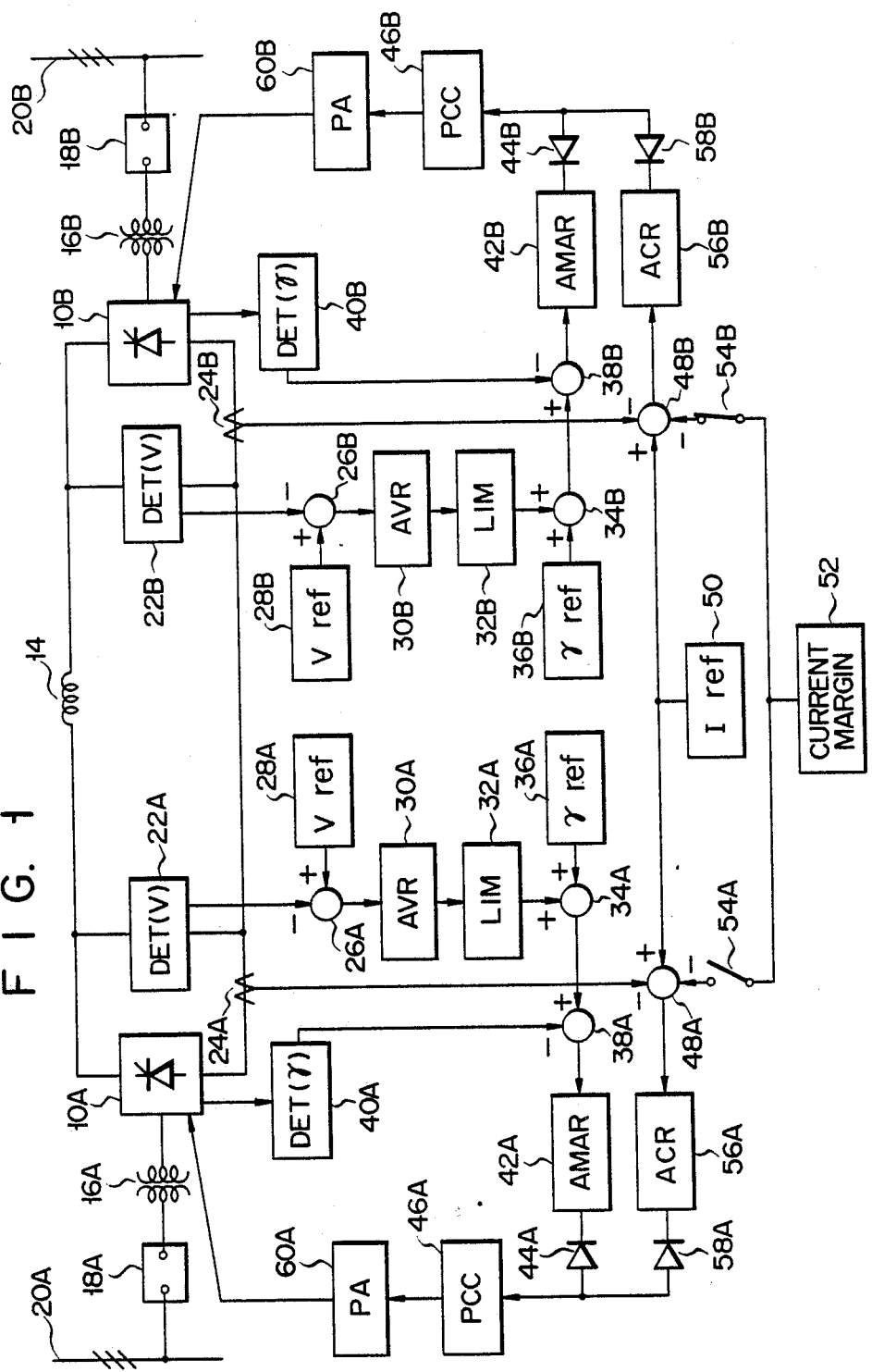
FIG. 1 is a block diagram of a control device according to the invention.

An embodiment of the invention will be described with reference to FIG. 1 which is a block diagram. This embodiment is applied to a two-terminal DC transmission system and can be applied also to a multi-terminal DC transmission system. Two converters 10A and 10B each comprised of thyristor valves are connected by a smoothing reactor 14. The converter 10A is connected to an AC system 20A through a main transformer 16A and a breaker 18A. The converter 10B is connected to an AC system 20B through a main transformer 16B and a breaker 18B. One end of the reactor 14 is connected to a DC voltage detector 22A and a DC current detector 24A. The other end of the reactor 14 is connected to a DC voltage detector 22B and a DC current detector 24B. The output of the DC voltage detector 22A is coupled to the negative terminal of a summing circuit 26A. The output of the DC voltage detector 22B is coupled to the negative terminal of the summing circuit 26B. Two reference voltage presetters 28A and 28B are connected to the positive terminals of the summing circuits 26A and 26B, respectively. The output signal from the summing circuit 26A is supplied to the first input terminal of a summing circuit 34A through an automatic voltage regulator 30A and a limiter 32A. The output signal from the summing circuit 26B is supplied to the first input terminal of a summing circuit 34B through an automatic voltage regulator 30B and a limier 32B. Reference margin-angle presetters 36A and 36B are connected to the second input terminals of the summing circuits 34A and 34B, respectively. The outputs of the summing circuits 34A and 34B are coupled to the positive terminals of summing circuits 38A and 38B, respectively. Two margin angle detectors 40A and 40B are equipped with the converters 10A and 10B, respectively. The outputs of the detectors 40A and 40B are respectively coupled to the negative terminals of the summing circuits 38A and 38B. The outputs of the summing circuits 38A and 38B are coupled to automatic margin-angle regulators 42A and 42B, respectively. The output of the automatic margin-angle regulator 42A is coupled to a phase control circuit 46A through a diode 44A. The output of the automatic margin-angle regulator 42B is coupled to a phase control circuit 46B through a diode 44B.

The DC current detectors 24A and 24B are connected to the first negative terminals of summing circuits 48A and 48B, respectively. A reference current presetter 50 is connected to the positive terminals of the summing circuits 48A and 48B. A current margin presetter 52 is connected to the second negative terminals of the summing circuits 48A and 48B through switches 54A and 54B. The output terminals of the summing circuits 48A and 48B are connected to automatic current regulators 56A and 56B. The output of the regulator 56A is coupled to the phase control circuit 46A through a diode 58A, and the output of the regulator 56B is connected to the phase control circuit 46B through a diode 58B. The diodes 44A and 58A form a low-value gate, and the diodes 44B and 58B form a low-value gate. The output of the phase control circuit 46A is coupled to the gate of the converter 10A through a pulse amplifier 60A. The output of the phase control circuit 46B is coupled to the gate of the converter 10B through a pulse amplifier 60B.

The operation of the control device shown in FIG. 1 will now be described.

The switches 54A and 54B are closed and opened in an interlocking function. When one of them is closed, the other is opened. When the switch 54A is closed the side including the switch 54A functions as an inverter, and the side including the switch 54B functions as a rectifier. Similarly, when the switch 54B is closed, the side including the switch 54B functions as an inverter and the side including the switch 54A functions as a rectifier. Assume that the switch 54B is closed and the switch 54A is opened as shown in FIG. 1. The difference value between the current reference $I_{ref}$ and the current detected by the detector 24A is supplied to the automatic current regulator 56A. The difference value between the input to the regulator 56A and the current margin is supplied to the automatic current regulator 56B. The diodes 44A and 58A which are connected to the input terminal of the phase control circuit 46A form a low-value gate. Similarly, the diodes 44B and 58B which are connected to the input terminal of the phase control circuit 46B form a low-value gate. The low-value gate supplies one of the two input signals, the phase angle leading to the other of the two input signals. Hence, the output signal from the automatic current regulator 56A is supplied to the phase control circuit 46A, and the output signal from the automatic margin-angle regulator 42B is supplied to the phase control circuit 46B. Therefore, the converters 10A and 10B function as a rectifier and an inverter, respectively.

The difference value between the DC voltage detected by the DC voltage detector and the voltage reference $V_{ref}$ is applied to the automatic voltage regulator. The output signal from the automatic voltage regulator varies the margin-angle which is to be set to the automatic margin-angle regulator. According to the margin-angle thus changed, the automatic margin-angle regulator keeps the DC voltage constant. When the DC voltage rises above the reference voltage $V_{ref}$, the output signal from the automatic voltage regulator 30B comes to have a positive value and the reference of margin-angle regulator 42B increases. As a result, as evident from equation (1), the DC voltage will lower. Conversely, the DC voltage will rise when it is lower than the voltage reference $V_{ref}$.

As described above, the margin-angle reference of the automatic margin-angle regulator 42B is varied according to the output signal from the automatic voltage regulator 30B. The DC voltage is equal to the voltage reference $V_{ref}$. Accordingly, the automatic margin-angle regulator 42B of the inverter side operates all the time and remains unsaturated all the time. The margin-angle is not reduced as the constant margin-angle control is subordinated to the constant voltage control. No commutation failure therefore occurs unlike in the conventional control device of this type.

The minimum margin-angle of either converter must be determined considering its turn-off time, i.e. the turn-off time of the thyristor. Further, the maximum margin angle is determined by a loss of the snubber circuit which the converter includes. For this reason, the output signals from the automatic voltage regulators 30A and 30B are supplied to the summing circuits 34A and 34B through the limiters 32A and 32B and then added to the margin-angle reference. The limiters 32A and 32B make the margin-angles reference of the automatic margin-angle regulators 42A and 42B fall within a predetermined range.

Figure 2:
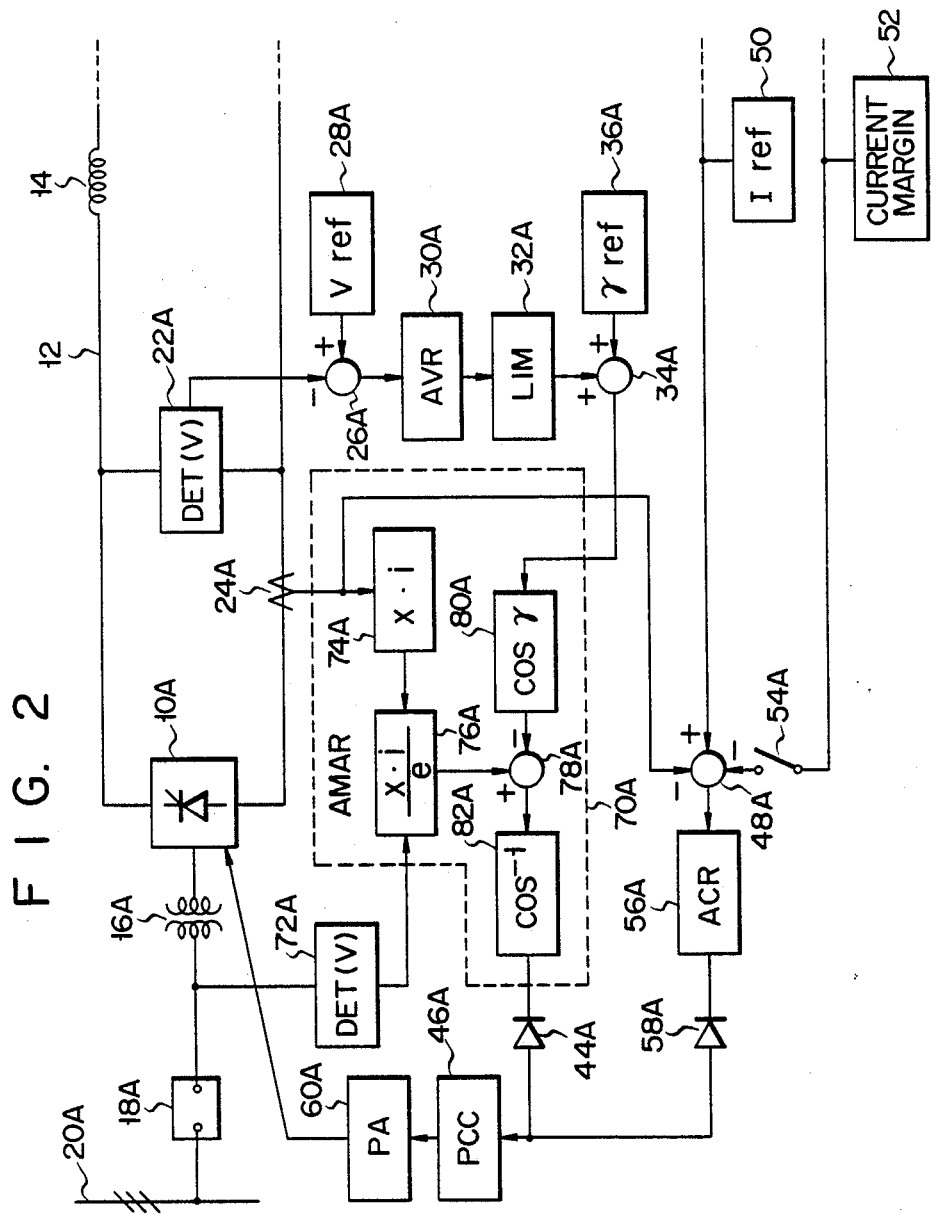
FIG. 2 is a block diagram of another control device according to the invention.

In the embodiment described above the margin-angle control is a closed loop control. The margin angle control is an open loop control in another embodiment illustrated in FIG. 2. FIG. 2 shows only the rectifier side of the second embodiment. In FIG. 2, the same numerals are used to designate the same elements as those shown in FIG. 1. The second embodiment differs from the first embodiment of FIG. 1 in two respects. First, it uses a different automatic margin-angle regulator 70A. Second, it is provided with a commutation voltage detector 72A. The following equation is known to apply to an open loop margin-angle regulator:

$$\cos\beta = \cos\gamma - \frac{x \cdot i}{e}, \quad (2)$$

where $\beta$ is the angle of advance of the inverter $(=\pi-\alpha)$, $\gamma$ is margin-angle, x is commutation reactance (P.U.), i is DC current (P.U.) and e is commutation voltage (P.U.).

As equation (2) indicates, an output signal i from a DC current detector 24A is supplied to a signal generator 74A. The signal generator 74A generates an output signal x·i, which is supplied to a divider 76A. An output signal e from the commutation voltage detector 72A is supplied to the divider 76A. The divider 76A generates an output signal (x·i)/e. This signal is supplied to the positive terminal of a summing circuit 78A. An output signal from a summing circuit 34A which represents the sum of the output signal from an automatic voltage regulator 30A and the margin-angle reference $\gamma_{ref}$ is supplied to the negative terminal of the summing circuit 78A through a cosine circuit 80A. The summing circuit 78A generates an output signal which represents $$\frac{x \cdot i}{e} - \cos\gamma (= -\cos\beta = \cos\alpha).$$

This output signal is supplied to an arc cosine circuit 82A. The circuit 82A generates an output signal which represents $\alpha$. This signal $\alpha$ is the output of the automatic margin-angle regulator 70A.

Also in the second embodiment, the margin-angle reference $\gamma_{ref}$ of the automatic margin-angle regulator 70A is varied by the output signal from the automatic voltage regulator 30A. The second embodiment can therefore achieve the same effect as the first embodiment. This proves that the automatic margin-angle regulator may either be a closed loop or an open loop.

As described above, according to this invention the output signal from an automatic voltage regulator is used to drive an automatic margin-angle regulator, thereby maintaining the DC voltage constant. Thus, the invention provides a control circuit for a converter, in which no commutation failure takes place when the AC voltage changes.

What we claim is:

1. A control device for a converter used in a DC transmission system, comprising:
    automatic voltage regulator means for generating a first control angle signal to keep DC voltage of said DC transmission system constant;
    automatic margin-angle regulator means for generating a second control angle signal for making a margin-angle of the converter equal to a margin-angle predetermined by said first control angle signal from said automatic voltage regulator means;
    automatic current regulator means for generating a third control angle signal for keeping DC current flowing through said DC transmission system constant; and
    switch circuit means for supplying said second control angle signal from said automatic margin-angle regulator means to the converter when the converter functions as an inverter and supplying said third control angle signal from said automatic current regulator means to the converter when the converter functions as a rectifier.

2. A control device according to claim 1, wherein said automatic margin-angle regulator means comprises a margin-angle presetter, a limiter for passing those of said first control angle signals from said automatic voltage regulator means which are within a predetermined range, a summing circuit for summing the output signals from the limiter and margin-angle presetter, a detector for detecting the margin-angle of the converter, and a regulator for determining the control angle of the converter according to the difference between the outputs from the summing circuit and detector.

3. A control device according to claim 1, wherein said automatic margin-angle regulator means comprises a margin-angle presetter, a limiter for passing those of said first control angle signals from said automatic voltage regulator means which are within a predetermined range of level, a summing circuit for summing the output signals from the limiter and margin-angle presetter, and a regulator for determining the control angle of the converter according to the output signal from the summing circuit.

4. A control device according to claim 1, wherein said switch circuit means comprises a reference current presetter, a current margin presetter, a current detector, a first summing circuit for supplying a signal obtained by subtracting the detector output from the current reference to said automatic current regulator means when the converter functions as a rectifier, a second summing circuit for supplying a signal obtained by subtracting the detector output and the current margin from the current reference to said automatic current regulator means when the converter functions as an inverter, and an low-value gate connected to said automatic margin-angle regulator means and said automatic current regulator means at input terminals and to the converter at the output terminal.

* * * * *